United States Patent [19]

Elser et al.

[11] 4,181,668
[45] Jan. 1, 1980

[54] ANTHRAQUINONE DYES

[75] Inventors: Wolfgang Elser, Wachenheim; Ernst Hartwig, Heidelberg; Manfred Ruske, Ludwigshafen, all of Fed. Rep. of Germany

[73] Assignee: BASF Aktiengesellschaft, Ludwigshafen, Fed. Rep. of Germany

[21] Appl. No.: 961,415

[22] Filed: Nov. 16, 1978

[30] Foreign Application Priority Data

Nov. 19, 1977 [DE] Fed. Rep. of Germany ....... 2751835

[51] Int. Cl.$^2$ .................. C07C 103/75; C09B 1/20
[52] U.S. Cl. .................. 260/377; 8/2.5 A; 428/480
[58] Field of Search .......... 260/377

[56] References Cited

U.S. PATENT DOCUMENTS

| 1,938,029 | 12/1933 | Kugel | 260/377 |
| 2,496,414 | 2/1950 | Seymour et al. | 260/377 |

FOREIGN PATENT DOCUMENTS

| 258775 | 2/1946 | Switzerland | 260/372 |
| 773212 | 4/1957 | United Kingdom | 260/377 |

*Primary Examiner*—Thomas A. Waltz
*Assistant Examiner*—Raymond Covington
*Attorney, Agent, or Firm*—Oblon, Fisher, Spivak, McClelland & Maier

[57] ABSTRACT

Anthraquinone dyes of the formula

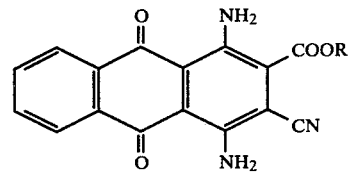

where R is $C_1$–$C_{10}$-alkyl, $C_5$–$C_8$-cycloalkyl, alkoxyalkyl of a total of 3 to 11 carbon atoms, phenoxyalkyl, where alkyl is of 2 to 4 carbon atoms, or phenyl-$C_1$–$C_4$-alkyl.

On synthetic fibers and blends thereof with cellulosic fibers, the dyes give brilliant clear blues.

The dyes are particularly suitable for transfer printing onto synthetic fibers and give high color yields. The transfer prints obtained have excellent fastness characteristics.

4 Claims, No Drawings

ANTHRAQUINONE DYES

The invention relates to novel anthraquinone dyes based on 1,4-diaminoanthraquinone.

The novel dyes have the general formula

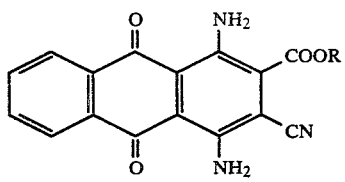

where R is linear or branched $C_1$–$C_{10}$-alkyl, $C_5$–$C_8$-cycloalkyl, alkoxyalkyl of a total of 3 to 11 carbon atoms, phenoxyalkyl, where alkyl is of 2 to 4 carbon atoms, or phenyl-$C_1$–$C_4$-alkyl.

On synthetic fibers and blends thereof with cellulosic dyes, the novel dyes give brilliant clear blues. The dyes are particularly suitable for transfer printing, the dyeings obtained having excellent fastness characteristics, and the color yield being high.

Alkyl R is of 1 to 10, preferably of 1 to 6, carbon atoms. Specific examples are methyl, ethyl, propyl, isopropyl, n-butyl, isobutyl, sec.-butyl, n-pentyl, isopentyl, n-hexyl, isohexyl, heptyl, n-octyl, isooctyl, 2-ethylhexyl, nonyl, isononyl, decyl and isodecyl.

Where R is cycloalkyl of 5 to 8 carbon atoms it may be, for example, cyclopentyl, cyclohexyl, methylcyclohexyl, dimethylcyclohexyl, cycloheptyl or cyclooctyl.

Examples of alkoxyalkyl and phenoxyalkyl R are 2-methoxyethyl, 2-ethoxyethyl, n- and iso-propoxyethyl, n- and iso-butoxyethyl, 2-(2'-ethylhexoxy)-ethyl, 3-methoxypropyl, 3-ethoxypropyl, 3-(n- and iso-propoxy)-propyl, 3-(n- and iso-butoxy)-propyl, 3-(2'-ethylhexoxy)-propyl, 2-phenoxyethyl, 3-phenoxypropyl, 2-phenoxypropyl and phenoxybutyl.

Examples of phenylalkyl R are phenylbutyl, phenylpropyl and, preferably, benzyl and β-phenylethyl.

Preferred dyes of the formula I are those where R is linear or branched $C_1$–$C_6$-alkyl, preferably $C_1$–$C_4$-alkyl, $C_1$–$C_4$-alkoxyethyl, benzyl or cyclohexyl, since these are particularly suitable for transfer printing.

Particularly preferred dyes of the formula I are those where R is isopropyl or n-butyl, since the dyeings obtained with these are very lightfast.

The novel dyes may be obtained by reacting a 1,4-diaminoanthraquinone-2-carboxylic acid ester of the formula

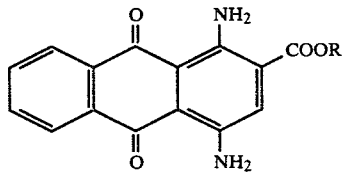

where R has the above meaning, with an ionic cyanide in the presence of one or more buffers in an organic solvent or solvent mixture in which the reactants are at least partially soluble.

The leuco form of the 1,4-diamino-2-cyanoanthraquinone-3-carboxylic acid ester, formed as an intermediate, is advantageously dehydrogenated with an oxidizing agent during or after the reaction.

The dyes according to the invention can also be obtained by trans-esterifying the lower alkyl esters, e.g. the methyl or ethyl ester, in the presence of a catalytic amount of a basic compound and of an excess of the desired alcohol ROH.

The 1,4-diaminoanthraquinone-2-carboxylic acid esters produced as starting compounds may be prepared, for example, by the process of German Laid-Open Application DOS 2,517,918.

Examples of suitable organic solvents in which (I) may be prepared are bis-$C_1$–$C_4$-alkylamides of lower aliphatic carboxylic acids, e.g. N,N-dimethylformamide, N,N-dimethylacetamide and N,N-dimethylpropionamide, N-$C_1$–$C_4$-alkylpyrrolidones, e.g. N-methylpyrrolidone, hexamethylphosphorotriamide, formamide, N-methylformamide and dimethylsulfoxide. It is also possible to use a mixture of two or more solvents or, in the case of the $C_1$–$C_6$-alkyl esters, a mixture of these solvents with the alcohol from which the ester is derived.

The organic phase may contain small amounts of water originating from the preparation of the solvents used or originating from the buffer employed. However, in general the water content is less than 5% by weight, as a rule less than 2% by weight.

Examples of suitable ionic cyanides are the alkali metal cyanides and alkaline earth metal cyanides, e.g. sodium cyanide, potassium cyanide, ammonium cyanide, magnesium cyanide, calcium cyanide and mixtures of these. For economic reasons, sodium cyanide and potassium cyanide are preferred.

Examples of suitable buffer substances are ammonium salts, e.g. ammonium chloride, ammonium sulfate, ammonium phosphate, ammonium acetate and ammonium formate, salts of primary, secondary or tertiary amines, salts of quaternary ammonium compounds, alkali metal formates, alkali metal acetates and alkaline earth metal acetates, but preferably primary and/or secondary alkali metal phosphates, e.g. the appropriate sodium phosphates and potassium phosphates, or mixtures of these compounds.

If the reaction is carried out in a solvent which is hydrolyzed by hydroxyl ions, the buffer required for the reaction can also be formed by reaction of the hydroxyl anion, formed during the reaction of the 1,4-diaminoanthraquinone derivative with the cyanide anion, with the hydrolyzable solvent. In that case, it is not necessary to add a buffer to the reaction mixture.

Suitable oxidizing agents for the dehydrogenation of the leuco form are organic nitro compounds, e.g. nitrobenzene, nitrobenzenesulfonic acid and nitrophenol, atmospheric oxygen and hydrogen peroxide. These reactants may already be present during the reaction with the cyanide ion, or may be added to the reaction mixture only after the said reaction. Where relevant, the oxidation can also be carried out in the presence of an oxygen transfer agent, e.g. ammonium vanadate.

The reaction with the cyanide is in general carried out at from 30° to 80° C., preferably from 50° to 65° C. If no oxidizing agent is present, 80° C. should not be exceeded. The reaction is as a rule complete after from about 20 to 240 minutes.

The dyes according to the invention are in particular suitable for transfer printing. For this application, dyes of the formula I, where R is $C_1$–$C_6$-alkyl, preferably $C_1$–$C_4$-alkyl, $C_1$–$C_4$-alkoxyethyl, benzyl or cyclohexyl, are preferred. Amongst these dyes, those where R is $C_1-C_4$-alkyl, especially isopropyl or n-butyl, are particularly preferred, since they give particularly good tinctorial yields in transfer printing and since the dyeings obtained have excellent fastness characteristics.

On sheet-like materials, e.g. nonwovens, felts, furs and films, and especially on fabrics of synthetic material or blend thereof with cellulosic fibers. e.g. those made of cellulose triacetate, nylon, polyacrylonitrile or, preferably, aromatic polyesters, or of mixtures of the said hydrophobic fibers with natural or regenerated fibers, especially with cotton, the dyes of the formula I give clear, brilliant blue prints.

In transfer printing, the dye is transferred from a carrier—as a rule consisting of paper, referred to as transfer paper, onto the fabric by sublimation at an elevated temperature.

The process of transfer printing is known (cf., for example, Color Index, 3rd edition, volume 2, page 2,480; French Patents 1,223,330, 1,334,829 and 1,585,119 and German Laid-Open Application DOS 1,769,757). Dye formulations, and carriers for use with transfer printing are disclosed in German Laid-Open Applications DOS 1,771,813 and 1,771,812. The dyes of the formula I may be used for transfer printing by conventional methods.

The novel compounds (I) are also important intermediates for the synthesis of greenish blue anthraquinone dyes, e.g. 1,4-diamino-anthraquinone-2,3-dicarboxylic acid imides.

In the Examples which follow, and which further explain the invention, parts are by weight.

EXAMPLE 1

780 Parts of dimethylformamide, 48 parts of milled sodium dihydrogen phosphate (monohydrate) and 355 parts of 1,4-diaminoanthraquinone-2-carboxylic acid methyl ester are heated to 55° C. and 81.5 parts of sodium cyanide are introduced in 2 portions with an interval of 15 minutes. The temperature rises to 65° C. The mixture is stirred until a thin layer chromatogram indicates that no starting material is left. For the dehydrogenation, a solution of 216 parts of primary sodium dihydrogen phosphate, 84 parts of sodium m-nitrobenzenesulfonate and 0.1 part of ammonium vanadate in 2,160 parts of water is added to the reaction mixture. The mixture is then stirred for 1 hour at 65°–70° C. after which it is heated for 1 hour at 70°–90° C. The dye is then filtered off, washed with warm water and dried.

334 parts of 1,4-diamino-2-cyano-anthraquinone-3-carboxylic acid methyl ester are obtained; melting point 215°–218° C.

EXAMPLE 2

16.9 parts of 1,4-diaminoanthraquinone-2-carboxylic acid isopropyl ester, 40 parts of dimethylformamide and 8 parts of sodium dihydrogen phosphate are heated at 50°–55° C. At this temperature, 5 parts of sodium cyanide are introduced and the mixture is stirred for two hours at 60°–62° C., after which no further starting compound is detectable in a thin layer chromatogram. A mixture of 100 parts of water and 10 parts of sodium m-nitrobenzenesulfonate is then added and the batch is stirred for 30 minutes at 60° C. The dye is filtered off warm, washed with warm water and dried.

Yield: 17.3 parts of 1,4-diamino-2-cyano-anthraquinone-3-carboxylic acid isopropyl ester; melting point 207°–208° C.

EXAMPLE 3

The procedure described in Example 2 is followed, but instead of 1,4-diamino-anthraquinone-2-carboxylic acid isopropyl ester the equivalent amount of the esters shown in the Table is used. The corresponding 1,4-diamino-2-cyano-anthraquinone-3-carboxylic acid esters are obtained in good yields.

[Structure: 1,4-diamino-2-cyano-anthraquinone-3-carboxylic acid ester with COOR and CN substituents]

| Example | R | Melting point (uncorrected) |
|---|---|---|
| 3 | $-C_2H_5$ | 196°–197° C. |
| 4 | $-C_4H_9$ | 143°–144° C. |
| 5 | $-CH_2-CH(CH_3)_2$ | 157° C. |
| 6 | cyclohexyl (−H) | 213°–214° C. |
| 7 | $-CH_2-$ phenyl | 201°–202° C. |
| 8 | $-CH_2-CH(CH_3)-$ phenyl | 161°–162° C. |
| 9 | $-CH_2-CH_2-O-C_3H_7$ | 117°–118° C. |
| 10 | $-CH_2-CH_2-O-C_4H_9$ | 113°–114° C. |
| 11 | $-CH_2-CH_2-O-$ phenyl | 177°–178° C. |
| 12 | $-CH_2-CH_2-CH_3$ | 172°–175° C. |
| 13 | $-CH_2(CH_2)_3-CH_3$ | 136°–137° C. |
| 14 | $-CH_2-CH_2-CH(CH_3)_2$ | 154°–156° C. |
| 15 | $-CH_2(CH_2)_4-CH_3$ | 131°–132° C. |
| 16 | $-CH_2-CH_2-O-CH(CH_3)_2$ | 137°–138° C. |

EXAMPLE 17

A mixture of 500 parts of formamide and 80 parts of methanol is prepared and 80 parts of 1,4-diamino-anthraquinone-2-carboxylic acid methyl ester and 60 parts of sodium cyanide are introduced, whilst stirring. The mixture is heated to 50° C. and a gentle stream of air is passed through it, whilst stirring. Stirring is continued until a thin layer chromatogram indicates that no starting material is left; this is generally the case after 5 hours. After cooling, the reaction mixture is added to 1,000 parts of water and 500 parts of ice, whilst stirring, and 200 parts of ammonium chloride are added to buffer the sodium hydroxide formed. The suspension is subsequently stirred whilst passing air through it, and the product is filtered off, washed neutral with warm water and rinsed with a little methanol. After drying, 81.5 parts of 1,4-diamino-2-cyano-anthraquinone-3-carboxylic acid methyl ester are obtained; melting point 914°–198° C.

Using the same process, 1,4-diamino-anthraquinone-2-carboxylic acid isopropyl ester gives 1,4-diamino-2-cyano-anthraquinone-2-carboxylic acid isopropyl ester in similar yield.

EXAMPLE 18

120 parts of β-phenylethyl alcohol, 20 parts of the methyl ester obtained as described in Example 17 and 2 parts of sodium cyanide are stirred at 70°–80° C., whilst distilling off a small amount of methanol present in the equilibrium. After 3 hours, no more starting material is detectable in a thin layer chromatogram;

If starting material is still present, the mixture has to be heated for a longer time. After it has cooled to room temperature, the reaction mixture is poured into a mixture of 450 parts of water and 150 parts of methanol and the suspension is stirred for 1 hour. It is then filtered and the filter residue is washed with 500 parts of a 1:3 mixture of methanol and water and finally three times with a small amount of methanol, and is then dried.

Yield: 18.7 parts of 1,4-diamino-2-cyano-anthraquinone-3-carboxylic acid β-phenylethyl ester, meltin point 160°–161° C.

Other esters can be prepared in the same way by trans-esterification. Instead of sodium cyanide, other weakly basic compounds, such as potassium cyanide, sodium carbonate and potassium carbonate, can also be used as the catalyst.

EXAMPLE 19

A paper is printed flexographically with an ink which consists of 10 parts of the dye obtaind as described in Example 3, 5 parts of ethylcellulose, 70 parts of ethanol, 20 parts of ethyl acetate and 5 parts of ethylglycol, and the print is dried. The paper is passed together with a knitted polyester fabric (the printed side resting on the fabric) through a calender for 30 seconds at 210° C. During this pass, the dye is transferred to the fabric, giving a blue print on a white ground.

If instead of the above dye, the dye obtained as described in Example 10 or Example 9 is used, a similar result is obtained.

EXAMPLE 20

A paper is gravure-printed with an ink which consists of 5 parts of the dye obtained as described in Example 6, 20 parts of a styrene polymer and 80 parts of toluene, and the print is dried. The pattern on the paper is then transferred by the method described in Example 19, in 35 seconds at 210° C., onto a woven polyester fabric. A blue print on a white ground is obtained.

If instead of the above dye, the dye obtained as described in Example 7 is used, practically the same result is obtained.

EXAMPLE 21

A paper is printed, by rotary screen printing, with an ink which consists of 20 parts of the dye obtained as described in Example 4, 380 parts of water, 400 parts of a 10% strength locust bean ether thickener and 200 parts of a 10% strength starch ether thickener, and the print is dried. The pattern on the paper is then transferred by the method described in Example 19, in 25 seconds at 220° C., onto a woven polyester fabric. A blue print on a white ground is obtained.

EXAMPLE 22

A transfer paper is offset-printed in the desired pattern with an ink which consists of 10 parts of the dye obtained as described in Example 3 and 90 parts of a varnish of the following composition: 40 parts of phenol-modified rosin, 20 parts of a vegetable drying oil, 10 parts of a long-oil alkyd resin, 25 parts of mineral oil, 10 parts of Aerosil and 2 parts of cobalt dryer.

The dried print is laid with the printed side on a woven polyester fabric and the combination is treated for 30 seconds at 200° C. in a sheet press. A lightfast and wetfast blue print on a white ground is obtained.

EXAMPLE 23

A paper is printed flexographically with an ink which consists of 10 parts of the dye obtained as described in Example 1, 5 parts of ethylcellulose, 70 parts of ethanol, 20 parts of ethyl acetate and 5 parts of ethylglycol, and the print is dried.

The printed paper is placed with the printed side on a woven polyester fabric and this combination is pressed in a sheet press for 30 seconds at 200° C. under a pressure of 4 kg/cm², with the paper facing the heated upper platen of the press. A deep blue print which has good lightfastness and wetfastness is obtained.

We claim:

1. An anthraquinone dye of the general formula

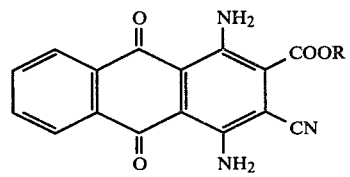

where R is linear or branched $C_1$–$C_{10}$-alkyl, $C_5$–$C_8$-cycloalkyl, alkoxyalkyl of a total of 3 to 11 carbon atoms, phenoxy-$C_2$–$C_4$-alkyl or phenyl-$C_1$–$C_4$-alkyl.

2. An anthraquinone dye as claimed in claim 1, where R is linear or branched $C_1$–$C_6$-alkyl.

3. An anthraquinone dye as claimed in claim 1, where R is linear or branched $C_1$–$C_4$-alkyl, $C_1$–$C_4$-alkoxyethyl, benzyl or cyclohexyl.

4. An anthraquinone dye as claimed in claim 1, where R is isopropyl or n-butyl.

* * * * *